Figure 1:
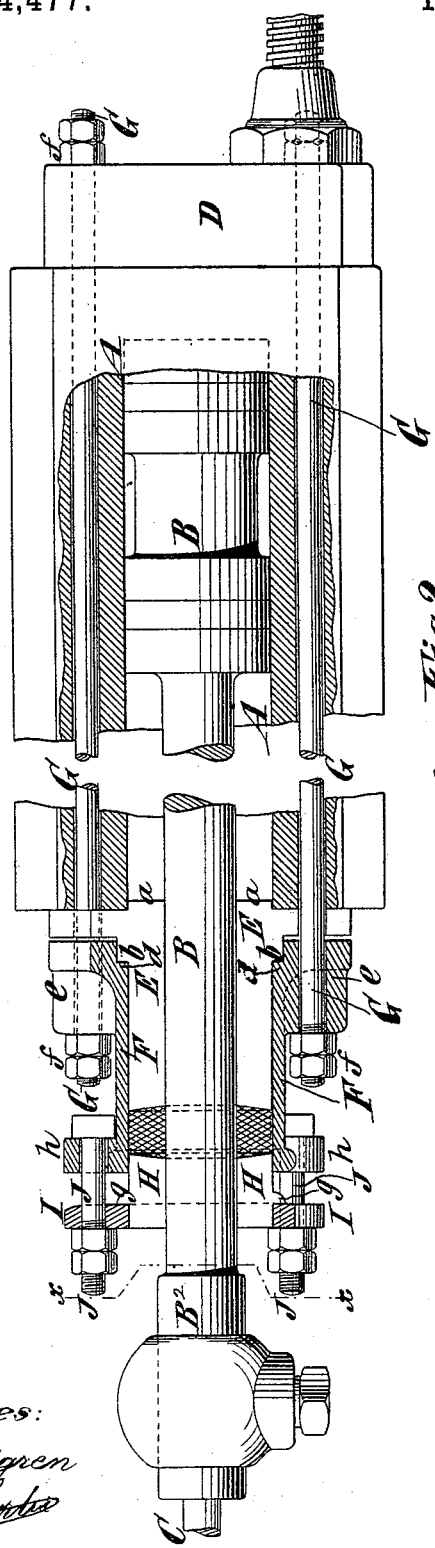

(No Model.)

G. R. CULLINGWORTH.
ROCK DRILL.

No. 344,477. Patented June 29, 1886.

Witnesses:
C. Sundgren
Emil H——

Inventor:
Geo. R. Cullingworth
by his Atty
Brown & Hall

N. PETERS, Photo-Lithographer, Washington, D. C.

UNITED STATES PATENT OFFICE.

GEORGE R. CULLINGWORTH, OF NEW YORK, N. Y.

ROCK-DRILL.

SPECIFICATION forming part of Letters Patent No. 344,477, dated June 29, 1886.

Application filed October 28, 1885. Serial No. 181,121. (No model.)

*To all whom it may concern:*

Be it known that I, GEORGE R. CULLINGWORTH, of the city of New York, in the county of New York and State of New York, have invented a new and useful Improvement in Rock-Drills, of which the following is a specification.

In many rock-drills the piston, piston-rod, and the chuck-body in which the drill rod or bit is secured are formed integral from one piece of metal, the chuck-body forming an enlargement upon the piston-rod. In rock-drills of this class it is necessary to divide the front or lower cylinder-head and the stuffing-box gland axially, in order to enable their sections to be placed laterally upon the piston-rod, which cannot be inserted lengthwise through a solid cylinder-head and gland because of the enlargement at the chuck end of the rod. In order to provide for so placing the lower head and gland in place, they have been composed each of two halves or sections, and the divided head has been surrounded by an undivided sleeve, which projects beyond the outer end of the head sufficiently to form a stuffing-box, while the divided gland of the stuffing-box has been surrounded by an undivided gland-ring, by which the gland-sections are forced into the stuffing-box. The bores or openings of the undivided sleeve and gland-ring which fit the exterior of the divided head and divided gland are sufficiently large to enable them to be slipped over the chuck enlargement of the piston-rod, if not over the piston itself, and after the divided head and divided gland are placed upon the rod the undivided sleeve and undivided gland-ring are slipped over the exterior of the head and gland in order to secure their sections together and hold them in place.

In my Letters Patent No. 328,195, October 13, 1885, I have represented a divided head and gland and an undivided sleeve and gland-ring combined as above described, and I have also represented the long cylinder-bolts, which connect the upper and lower heads, as serving also the purpose of gland-bolts. These long bolts pass through lugs or ears upon the undivided sleeve, and are provided with integral collars or shoulders, which bear upon the sleeve and hold it and the head in place, while the portions of the bolts which project beyond the said integral collars or shoulders extend through the undivided gland-ring and serve as gland-bolts. These long bolts with forged collars or shoulders are expensive, and they also stretch considerably; and the object of my invention is to provide a simpler and less expensive means for securing the undivided sleeve with its divided head and the undivided gland-collar with its divided gland in place.

To this end my present invention consists in the combination, with a divided head and divided gland and the undivided sleeve and gland-collar, the sleeve being provided with ears or lugs at its outer end, of long bolts for securing the undivided sleeve and the divided head in place, and other bolts, independent of the long cylinder-bolts, passing through the lugs or ears upon the sleeve and the undivided gland-collar, and serving to secure the gland-collar and divided gland in place. It is desirable to make the length of the sleeve as short as possible, and in order to enable the short gland-bolts to be introduced through the lugs or ears upon the sleeve these lugs or ears are offset circumferentially or staggered relatively to the lugs or ears, through which the long cylinder-bolts pass, as will be more fully hereinafter described.

Figure 2:
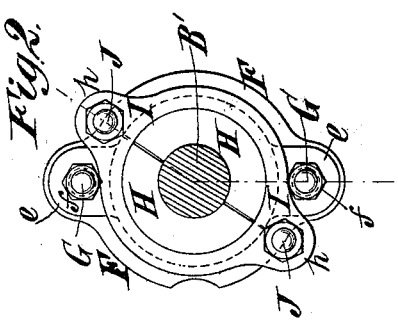

In the accompanying drawings, Figure 1 is a longitudinal section of the principal portions of a drill embodying my invention; and Fig. 2 is a transverse section and end view upon the plane of the dotted line *x x*, Fig. 1.

Similar letters of reference designate corresponding parts in both figures.

A designates the cylinder, and B the piston, which is fitted to reciprocate therein.

B' designates the piston-rod, and B² an enlarged portion thereof at the end of the piston-rod, which forms the chuck in which the drill or bit C is secured. As here represented, the piston-rod with its piston at one end and its enlargement at the other end are formed integral. The cylinder is closed at its back or upper end by a head, D, and at its front or lower end by a head, E. The head E is divided axially, or composed of two or more similar sections, which may be placed laterally upon the piston-rod B'. As here represented, this divided head has a projection, $a$, which enters the front end of the cylinder, and it has on the outside an annular shoulder, $b$.

F designates the undivided sleeve, which is fitted to the cylindric exterior of the divided head E, and projects sufficiently beyond the front end thereof to form a stuffing-box for packing. The undivided sleeve has an internal shoulder, $d$, which bears against the shoulder $b$ on the exterior of the divided head, and thereby holds said head securely in place. The undivided sleeve has at diametrically-opposite points lugs or ears $e$, through which pass long cylinder bolts G, whereby both the heads D and E are secured to the ends of the cylinder. These bolts may consist simply of ordinary round iron or steel, threaded at opposite ends, and there provided with nuts $f$. They are thus made in a very simple manner and at a small cost.

To the stuffing-box, which is formed in the projecting end of the undivided sleeve, is fitted an axially-divided gland, H, composed of two or more sections like the head E, and which are applied laterally to the piston-rod. This divided gland is held in place by an undivided gland-collar, I, which bears upon the shoulder $g$, formed on the gland, and both the divided gland and the undivided collar are held in place by bolts J, which pass through the collar and through lugs or ears $h$, projecting laterally from the sleeve F at the front end thereof. These gland-bolts J are of common form, and as such bolts are made in quantity very cheaply they are inexpensive and may be replaced at small cost.

As the bolts J, which secure the gland and gland-collar in place, are entirely separate from and independent of the long cylinder-bolts G, the tightness of the gland will not be affected by any stretching of the cylinder-bolts. As best seen in Fig. 2, the lugs or ears $h$, which are upon the front end of the sleeve F, are not in line with the lugs $e$ on the said sleeve, through which the cylinder-bolts G pass, and hence the gland-bolts J may be readily inserted through the lugs or ears $h$ without making the sleeve F as long as would be necessary if the bolts J and G were in the same plane.

What I claim as my invention, and desire to secure by Letters Patent, is—

1. The combination, with the divided head and undivided sleeve, forming a stuffing-box, and a divided gland and undivided gland-collar, the sleeve being provided at its front end with lugs or ears, of the long cylinder-bolts G, whereby the sleeve and head are secured in place, and the gland-bolts J, separate from and independent of the bolts G, and securing the gland-collar and gland in place relatively to the sleeve, substantially as herein described.

2. The combination, with the divided head and the undivided sleeve provided with lugs or ears $e$, and with lugs or ears $h$, offset circumferentially from the plane of the lugs or ears $e$, of the long cylinder-bolts G, for securing the sleeve and head in place, the divided gland and undivided gland-collar, and the gland bolts J, separate from and independent of the bolts G, substantially as herein described.

G. R. CULLINGWORTH.

Witnesses:
    FREDK. HAYNES,
    HENRY MCBRIDE.